US008696274B2

(12) United States Patent  
Kim et al.

(10) Patent No.: US 8,696,274 B2  
(45) Date of Patent: Apr. 15, 2014

(54) TORQUE CONTROL BOLT FOR HOSE CLAMP

(71) Applicant: Dong-A Metal Co., Ltd., Gyeongbuk (KR)

(72) Inventors: Myung Hoon Kim, Daegu-shi (KR); Cheong Yong Cho, Siheung-si (KR); Young Jin Bae, Daegu-shi (KR); Jin Woo Kim, Daegu-shi (KR); Kyu Dong Park, Daegu-shi (KR)

(73) Assignee: Dong-A Metal Co., Ltd., Gyeongsangbuk-Do (KR)

( * ) Notice: Subject to any disclaimer, the term of this patent is extended or adjusted under 35 U.S.C. 154(b) by 0 days.

(21) Appl. No.: 13/865,733

(22) Filed: Apr. 18, 2013

(65) Prior Publication Data

US 2013/0280004 A1 Oct. 24, 2013

(30) Foreign Application Priority Data

Apr. 18, 2012 (KR) ........................ 10-2012-0040316

(51) Int. Cl.  
*F16B 31/00* (2006.01)

(52) U.S. Cl.  
USPC .............................................. 411/2; 411/395

(58) Field of Classification Search  
USPC ............ 411/1–4, 9, 14.5, 381, 382, 395, 402, 411/916, 917; 24/23 B, 274 P, 274 WB  
See application file for complete search history.

(56) References Cited

U.S. PATENT DOCUMENTS

| | | | | | |
|---|---|---|---|---|---|
| 2,330,898 | A | * | 10/1943 | King | 24/279 |
| 2,386,629 | A | * | 10/1945 | North et al. | 24/274 R |
| 2,899,733 | A | * | 8/1959 | Sundberg | 24/279 |
| 3,365,218 | A | * | 1/1968 | Denyes | 285/253 |
| 3,461,769 | A | * | 8/1969 | Brosseit | 411/385 |
| 3,778,539 | A | * | 12/1973 | Baier | 174/152 R |
| 4,295,765 | A | * | 10/1981 | Burke | 410/101 |
| 5,653,481 | A | * | 8/1997 | Alderman | 285/363 |
| 5,928,468 | A | * | 7/1999 | Tolson | 156/578 |
| 6,017,177 | A | * | 1/2000 | Lanham | 411/410 |
| 2009/0169324 | A1 | * | 7/2009 | Fritsch | 411/4 |

\* cited by examiner

*Primary Examiner* — Roberta Delisle  
(74) *Attorney, Agent, or Firm* — Lowe Hauptman & Ham, LLP

(57) ABSTRACT

Disclosed is a torque control bolt for a hose clamp, which is configured to transmit a torque from a tool to a fastening bolt of a hose clamp to induce the fastening of the hose clamp, and then to be ruptured to prevent the transmission of torque exceeding a set value so as to prevent the damage of the hose clamp and the hose. The control bolt includes: a rupture bolt with a fastening body to transmit the torque from the tool to a head of the fastening bolt; a coupling unit formed on the head and the rupture bolt and configured to keep the coupling force between the head and the rupture bolt; and a rupture section formed on the rupture bolt and configured to prevent the torque from the tool from being transmitted to the fastening bolt when the torque exceeds the set value.

9 Claims, 11 Drawing Sheets

TORQUE CONTROL BOLT FOR HOSE CLAMP

CROSS REFERENCE TO RELATED APPLICATION

This application claims the priority of Korean Patent Application No. 10-2012-0040316, filed on Apr. 18, 2012 in the (Korean Patent and Trademark Office), which is incorporated herein by reference in its entirety.

BACKGROUND OF THE INVENTION

1. Field of the Invention

The present invention relates to a torque control bolt for a hose clamp, and more particularly to a torque control bolt configured to be coupled with a fastening bolt that tightens or releases a hose clamp, so as to prevent the hose clamp or a hose from being deformed or damaged by being clamped with excessive torque.

2. Description of the Prior Art

In general, a hose clamp is used to tighten a hose to prevent the hose from being loosened. For example, the hose may involve a hose used in a brake, an air conditioning system, a power steering system or an engine room for a vehicle to allow a flow passage of fluid or gas, or a hose fitted on a pipe or a connecting tube to allow a flow passage of fluid or gas in an industrial field.

In order to prevent the hose clamp as described above or a hose from being damaged or deformed when the hose is tightened using the hose clamp, an assembling torque may be set or visibly indicated to enable the hose clamp to be assembled with reference to the set torque in an assembling field.

However, when a technician performs an assembling work to comply with an assembly torque set at the time of designing, it is required to confirm a torque applied for tightening using a separate specific torque wrench or the like, and to separately confirm whether the assembling work is normally performed. Consequently, it is difficult to perform an efficient work.

For this reason, an impact wrench, which is electrically, hydraulically or pneumatically operated, is used to quickly tighten the hose clamp, thereby maximizing the work efficiency.

When the assembling work is performed in this manner, the tightening of the hose clamping may be quickly completed. However, upon being tightened using an electric power, hydraulic power or pneumatic power, the hose clamp may be frequently clamped by a torque that exceeds a limit torque as well as an optimum assembling torque set at the time of designing the hose clamp.

When the hose clamp is clamped by a torque exceeding the limit torque, the hose clamp and the hose tightened by the hose clamp may be damaged. Consequently, it is difficult to maintain the hose clamp and the hose at a normal condition after the clamping or tightening is completed. Furthermore, it is also difficult to visually confirm a damaged or ruptured condition during the assembling process. As a result, a problem may be caused in that fluid or gas may leak out in the process of using the hose clamp or hose in the practically assembled state.

In order to solve this problem, a torque control cap has been developed and used which enables a hose clamp to be assembled by an assembling torque which is set at the time of designing the hose clamp, even if the hose clamp is assembled using a specific assembling tool, such as an impact wrench in an assembling field. Korean Patent Application No. 2011-0100136 filed in the name of the assignee of the present application discloses a torque control cap for a hose clamp as illustrated in FIG. 11.

Referring to FIG. 11, a torque control cap 1 for a hose clamp includes: a fastening tip 4 configured to be engaged with a head 3 of a fastening bolt 2 to transmit a clamping force of an assembling tool to the fastening bolt 2, the fastening bolt 2 being configured to decrease or increase the diameter of the hose clamp; and rupture sections 5 formed on the head 3 and the fastening tip 4 and configured to be ruptured when a force exceeding a set (assembling) torque for tightening the hose at an optimum condition is transmitted to the fastening bolt 2, thereby preventing the tightening force from being transmitted to the fastening bolt 2 anymore.

In the prior art as set forth above, rupture protrusions and rupture recesses are formed on the head of the fastening bolt and the fastening tip so that they are kept engaged with each other prior to tightening the hose clamp by the fastening bolt. However, since the rupture protrusions and the rupture recesses are merely engaged with each other, it is difficult to keep the engaged condition without strictly controlling the sizes of the rupture protrusions and the rupture recesses.

In other words, since the rupture protrusions and the rupture recesses are configured to be merely engaged with each other, the assembly of the rupture protrusions and the rupture recesses in this manner is enabled only when the they are precisely controlled in terms of size. Such a precise size control may produce a lot of defective products, and the rupture protrusions and the rupture recesses are not smoothly engaged with each other in the process of assembling a produced bolt head and fastening tip. Thus, the bolt head and the fastening tip are assembled by hitting any of them with a rubber hammer. Such a rubber hammer is used to reduce the impact and damage. However, in this process, when the rupture protrusions and the rupture recesses are not aligned to be in line with each other, respectively, the rupture sections may be easily ruptured or damaged. As a result, the assembly is difficult, and the productivity is remarkably deteriorated.

That is, when the fastening bolt and fastening tip are stored or transported in the state where the rupture sections are engaged with each other, the fastening bolt and fastening tip may be easily and frequently separated from each other due to vibration or impact produced in the process of moving them. Furthermore, the rupture sections may be fractured by impact. In a case where the rupture sections were already fractured prior to practically performing an assembling process in an assembling field, it may be impossible to fasten the fastening bolt with the set assembling torque.

After the hose clamp is tightened, the fastening tip may be separated but the rupture protrusions formed on the fastening tip and engaged in the rupture recesses formed in the head of the fastening bolt are not separated directly after assembling. However, the rupture protrusions may be separated from the rupture recesses and escape due to vibration or the like in the process of practical use, and may penetrate into various components of an industrial equipment or an engine, thereby causing a damage or trouble.

SUMMARY OF THE INVENTION

Accordingly, the present invention has been made to solve the above-mentioned problems occurring in the prior art, and an object of the present invention is to provide a torque control bolt for a hose clamp, which is configured to transmit a torque from a tool to a fastening bolt of a hose clamp to induce the normal fastening of the hose clamp, and then to be ruptured to prevent the transmission of torque exceeding a set value so as to prevent the damage of the hose clamp and the hose.

In order to accomplish this object, there is provided a control bolt includes: a rupture bolt with a fastening body to transmit the torque from the tool to a head of the fastening bolt; a coupling unit formed on the head and the rupture bolt and configured to keep the coupling force between the head and the rupture bolt; and a rupture section formed on the rupture bolt and configured to prevent the torque from the tool from being transmitted to the fastening bolt when the torque exceeds the set value. The coupling unit includes a male coupler that protrudes from the center of the inner end of the bolt body of the rupture bolt toward the fastening bolt, and a female coupler formed concavely at the center of the head of the fastening bolt to accommodate the male coupler. The rupture section includes a notch formed at a boundary position between the bolt body and the male coupler, and a rupture guide recess formed extending from the center of the outer end toward the inner end of the bolt body to reduce the thickness at a position to be ruptured.

According to the present invention, it is possible to prevent an excessive force from being transmitted at the time of fastening a hose clamp, so that the hose clamp and the hose can be prevented from being damaged and the fastening operation can be very efficiently accomplished.

Furthermore, according to the present invention, various effects can be achieved as described herein below:

It is possible to enhance a general productivity of a hose clamp by enabling the hose clamp to be easily assembled with a fastening bolt. In addition, since the hose clamp is fastened in the assembled state or at a set (assembling) torque so that the torque control bolt is prevented from being easily separated or escaping in the ruptured state, it is possible to avoid a secondary accident while the hose clamp is being used. Furthermore, since the rupture is correctly produced at the set (assembling) torque determined at the time of designing, it is possible to prevent the hose clamp and the hose from being damaged.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred constructions and functions of the present invention for achieving the above-described objects will be described with reference to the accompanying drawings.

Figure 1:
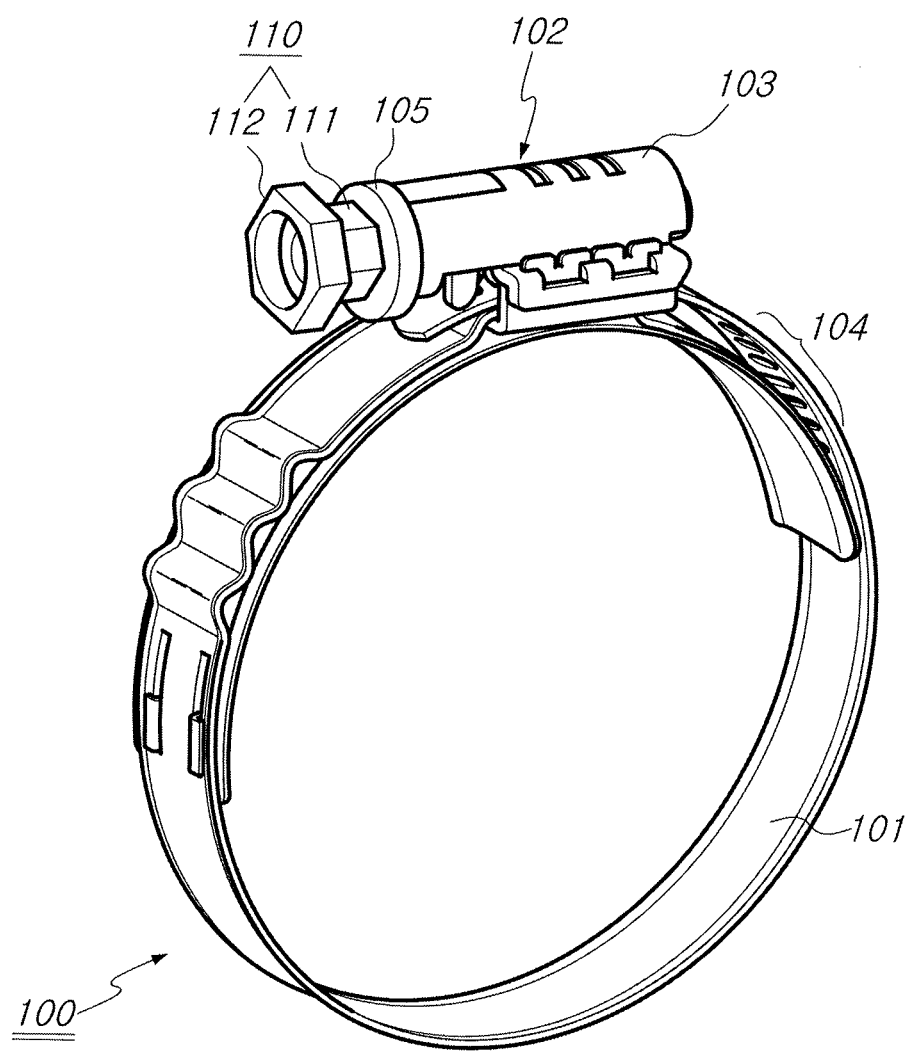
FIG. 1 is a perspective view illustrating a hose clamp, to which a torque control bolt according to an exemplary embodiment of the present invention is applied.
Figure 2:
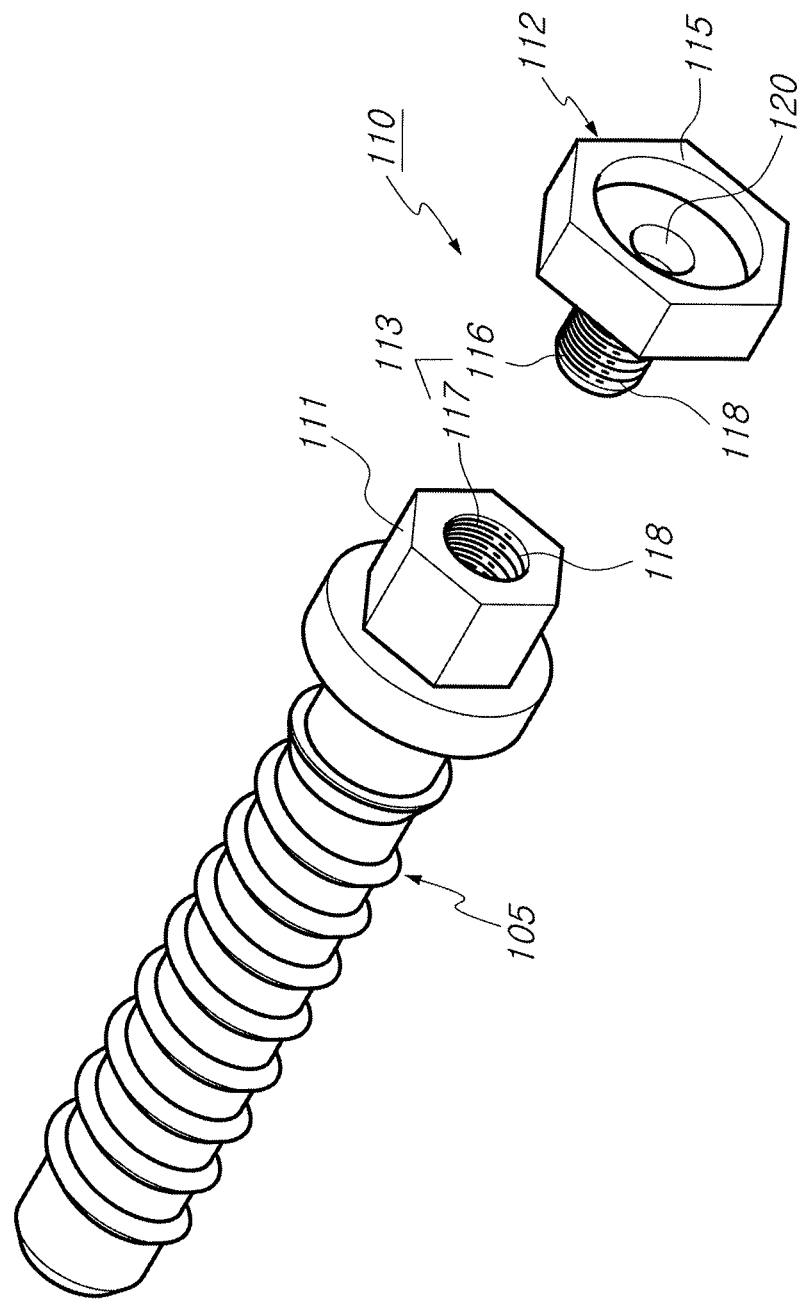
FIG. 2 is an exploded perspective view illustrating a first embodiment of the inventive torque control bolt for a hose clamp.
Figure 3:
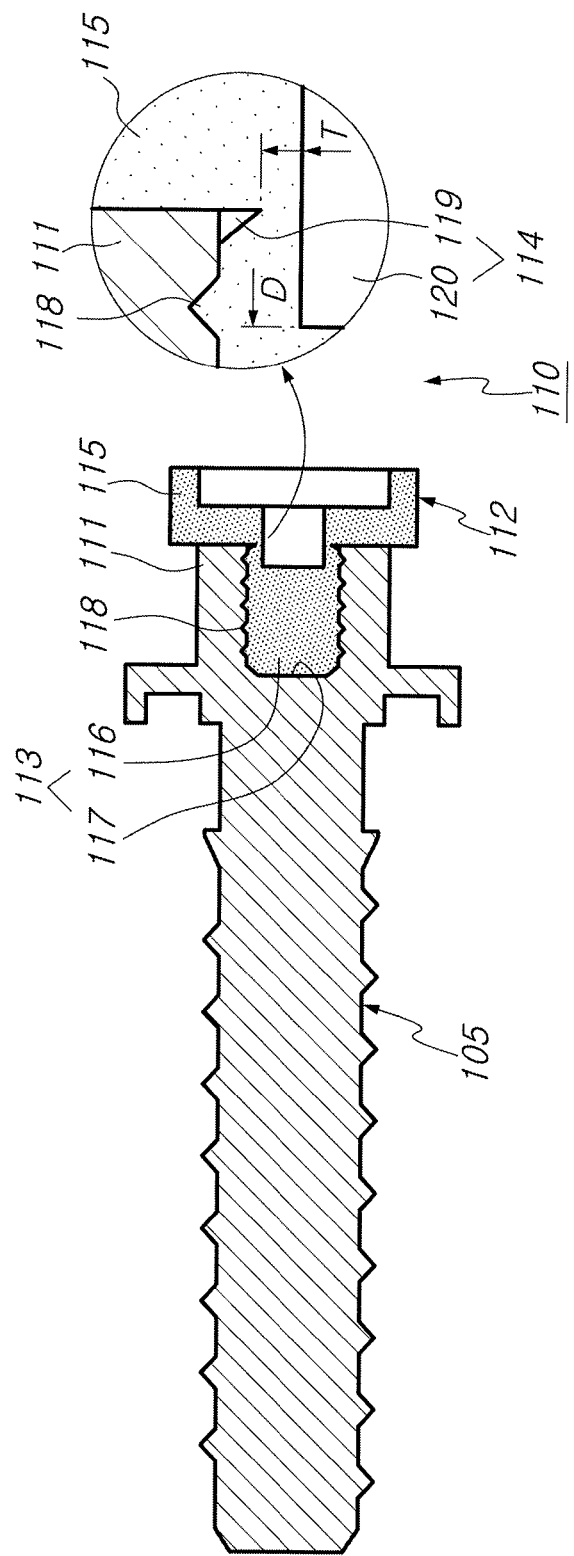
FIG. 3 is a longitudinal cross-sectional view of the first exemplary embodiment of the inventive torque control bolt for a hose clamp.
Figure 4:
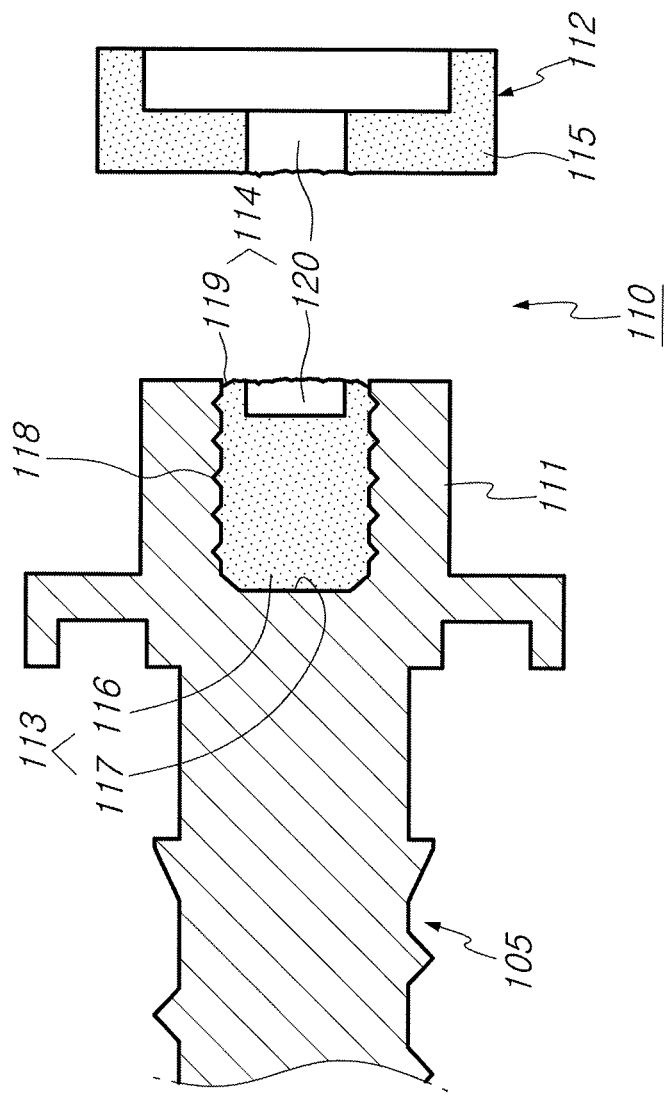
FIG. 4 schematically illustrates how a rupture is produced in the first exemplary embodiment of the inventive torque control bolt for a hose clamp.

FIG. 1 is a perspective view illustrating a hose clamp, to which a torque control bolt according to an exemplary embodiment of the present invention is applied, FIG. 2 is an exploded perspective view illustrating a first embodiment of the inventive torque control bolt for a hose clamp, FIG. 3 is a longitudinal cross-sectional view of the first exemplary embodiment of the inventive torque control bolt for a hose clamp, and FIG. 4 schematically illustrates how a rupture is produced in the first exemplary embodiment of the inventive torque control bolt for a hose clamp.

A hose clamp 100 includes a clamp body 101 formed by banding a narrow and long plate member in a circular shape, in which a tightening/releasing module 102 is provided at one of left and right ends of the clamp body 101. The tightening/releasing module 102 is configured to reduce or increase the diameter of the 101 to tighten or release a hose.

The tightening/releasing module 102 anchors a fastening housing 103 to an end of the clamp body 101, and a fastening bolt 105 is rotatably fitted in the fastening housing 103. The fastening bolt 105 is formed with a thread which is engaged with a fastening slot 104 formed in the clamp body 101 in such a manner that, when the fastening bolt 105 is rotated forwardly or reversely, the diameter of the clamp body 101 is reduced or increased to be capable of tightening or releasing the hose.

According to a feature of the present invention, there is provided a torque control bolt 110 configured to transmit an optimum (assembling) torque set to be suitable for a size, type or material of the hose at the time of designing to the fastening bolt 105 to fasten the hose clamp 100, and then to be ruptured so that the torque is not transmitted to the fastening bolt 105 anymore.

The torque control bolt 110 is configured to be combined with a rupture bolt 112, in which the rupture bolt 112 is configured to transmit a torque from a tool to the head 111 of the fastening bolt 105, and to be ruptured by a set torque so as to block the transmission of the fastening force of the tool to the fastening bolt 105.

A coupling unit 113 is provided on the head 111 and the rupture bolt 112, in which the coupling unit 113 is configured to transmit the clamping force until the clamping force does not exceed the set torque so that the engagement between the head 111 and the rupture bolt 112 can be maintained. In addition, a rupture section 114 is formed on the fastening bolt 112, in which, when the torque transmitted from the tool exceeds the set (assembling) torque, the rupture section 114 is ruptured to prevent the torque from being transmitted to the fastening bolt 105 anymore.

The rupture bolt 112 is provided with a hexagonal bolt body 115 which may be formed with tool application surfaces on the outer periphery thereof. Each of the tool application surfaces may be formed concavely to reduce the material of the bolt body 115 while reducing the weight of the bolt body 115.

In the coupling unit 113, a male coupler 116 extends in the longitudinal direction of the fastening bolt 105 at the inner center of the bolt body 115, and is engaged with the female coupler 117 formed concavely at the center of the head 111 of the fastening bolt 105.

The size of the bolt body 115 may be formed larger or smaller than that of the head 111 of the fastening bolt 105 so that, when the bolt body 115 is assembled using a tool, the head 111 of the fastening bolt 105 is prevented from being coupled and rotated together with the bolt body 115 by the tool.

The male coupler 116 and the female coupler 117 are formed in cylindrical shapes to be engaged with each other, and the outer periphery of the male coupler 116 and the inner periphery of the female coupler 117 are formed with threads 118, respectively, so that the head 111 and the rupture bolt 112 may be readily assembled.

The threads 118 may be formed in various forms. For example, each of the threads 118 may be formed in a single screw thread, or may be formed in a double screw thread in order to ensure quick assembly. Alternatively, the threads 118 may be formed only at a part of the outer or inner peripheral surface of each of the male coupler 116 and the female coupler 117 rather than being formed on the entire outer or inner surface of each of the male coupler 116 and the female coupler 117.

The rupture section 114 may be provided by a notch 119 formed at a boundary position between the bolt body 115 of the rupture bolt 112 and the male coupler 116, and a rupture guide recess 120 formed to extend from the outer center of the bolt body 115 to the inside of the bolt body 115, thereby reducing the thickness at the position to be ruptured.

The shape of the notch 119 is illustrated as a substantially triangular shape in cross-section in the drawings. However, the notch 119 may be formed in various shapes, such as a semi-circular shape, a rectangular shape or the like. Therefore, it is natural that the present invention is not limited to the exemplary embodiments shown in the drawings.

The depth D of the rupture guide recess 120 is preferably deeper than the position of the notch 119 from the outer surface of the bolt body 115 so that a rupture may occur more easily. The thickness T between the notch 119 and the rupture guide recess 120 may be properly determined to be suitable for the assembling torque through calculation at the time of designing the fastening bolt 105. Thus, the thickness T will not be described specifically herein.

Now, the use of the inventive torque control bolt 110 for a hose clamp will be described.

When the diameter of the hose clamp 100 is increased larger than the outer diameter of the hose to be fitted on the hose, and then the connection of the hose with an object is completed, the hose clamp 100 is moved to the position where the hose and the object are connected with each other, and then the diameter of the hose clamp 100 is reduced to compress the outer diameter of the hose, thereby tightening the hose.

When it is desired to tighten the hose in this manner, it is required to make the power of a tool be transmitted to the fastening bolt 105 in the hose clamp 100 through the torque control bolt 110 provided as described above. Then, the torque control bolt 110 receives the power of the tool and reduces the diameter of the hose clamp 100 to tighten the hose, and fastening is completed with the optimum torque (set torque). Accordingly, it is possible to prevent the hose clamp 100 from excessively tightening the hose to such an extent that the hose clamp 100 and the hose may be damaged.

That is, prior to completing the hose clamp 100 by coupling the fastening bolt 105 to the fastening housing 103, the rupture bolt 112 is previously coupled to the head 111 of the fastening bolt 105, thereby completing the torque control bolt 110. In this state, if the fastening tool is engaged with the rupture bolt 112 coupled to the head 111 of the fastening bolt 105, and then operated, the torque of the tool is transmitted to the fastening bolt 105 through the rupture bolt 112, so that the diameter of the clamp body 101 may be reduced to tighten the hose.

In this process, the clamping force applied by the fastening tool is not transmitted to the fastening bolt 105 infinitely. When the clamping force arrives at the set (assembling torque) determined at the time of designing, the rupture section 114 is ruptured, and hence the bolt body 115 of the rupture bolt 112 is separated. As such, there remains only the male coupler 116, which is coupled to the female coupler 117 formed on the head 111 of the fastening bolt 105.

Since the notch 119 is formed at the boundary position between the bolt body 115 and the male coupler 116, and the rupture recess 120 is formed inwardly concavely at the center of the outer surface of the bolt body 115, the practical thickness of the male coupler 116 at the rupture position extends from the notch 119 to the rupture guide recess 120, and is enabled to be easily ruptured. As a result, the bolt body 115 of the rupture bolt 112 is ruptured at the rupture section 114 to be separated.

Specifically, the thickness from the notch 119 of the rupture section 114 to the rupture guide recess 120 is numerically determined depending on the type of the hose to be applied and the standard of the hose clamp 100 at the time of designing, and the notch 119 and the rupture guide recess 120 are formed thereby. Consequently, even if an excessive torque is transmitted from the tool when the hose clamp 100 is fastened using a tool, the rupture section is ruptured at the set (assembling) torque, and hence the torque of the tool is not transmitted to the fastening bolt 105, thereby preventing the hose clamp 100 or the hose from being damaged.

When it is required to separate the hose clamp 100 to maintain and repair the hose due to the rupture of the rupture bolt 112 in the process of using the hose clamp 100, it is easy to separate the hose clamp 100 using a tool since the head 111 of the fastening bolt 105 remains as it is.

Figure 5:
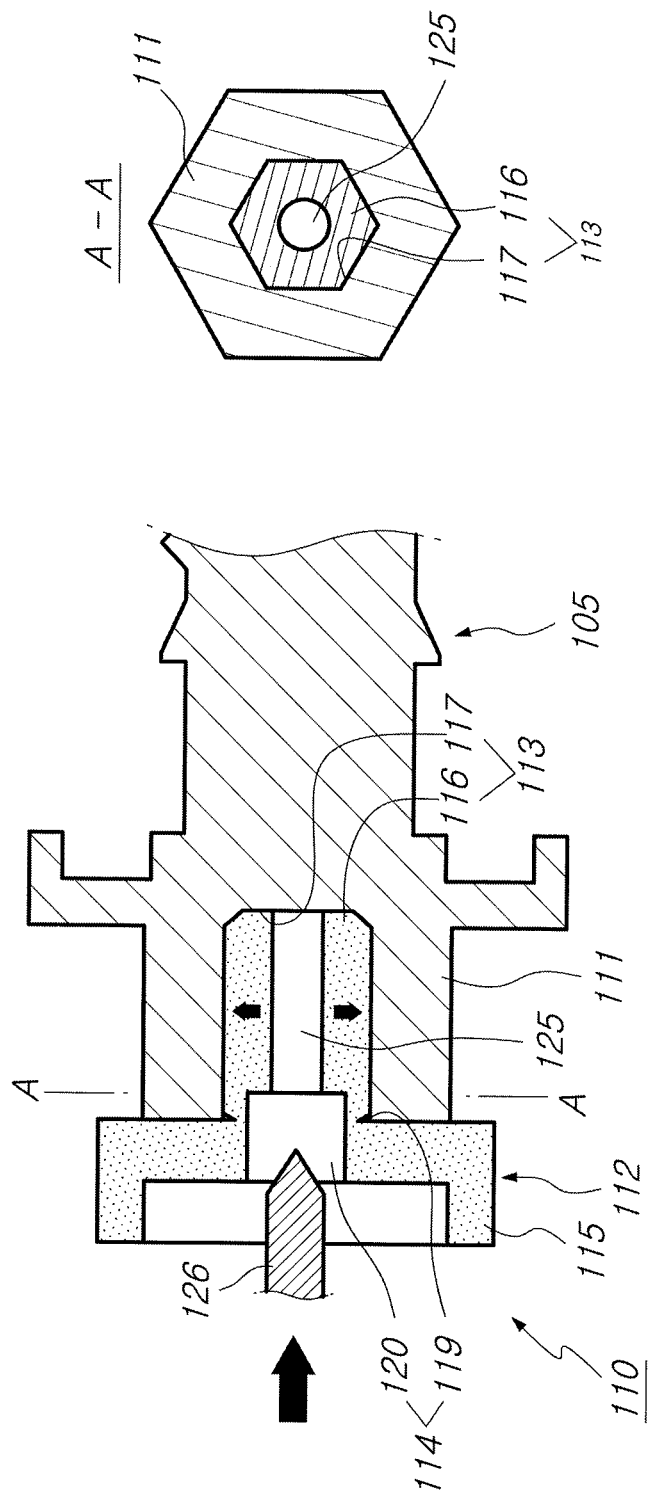
FIG. 5 is a longitudinal cross-sectional view of a part of a second exemplary embodiment of the inventive torque control bolt for a hose clamp.
Figure 6:
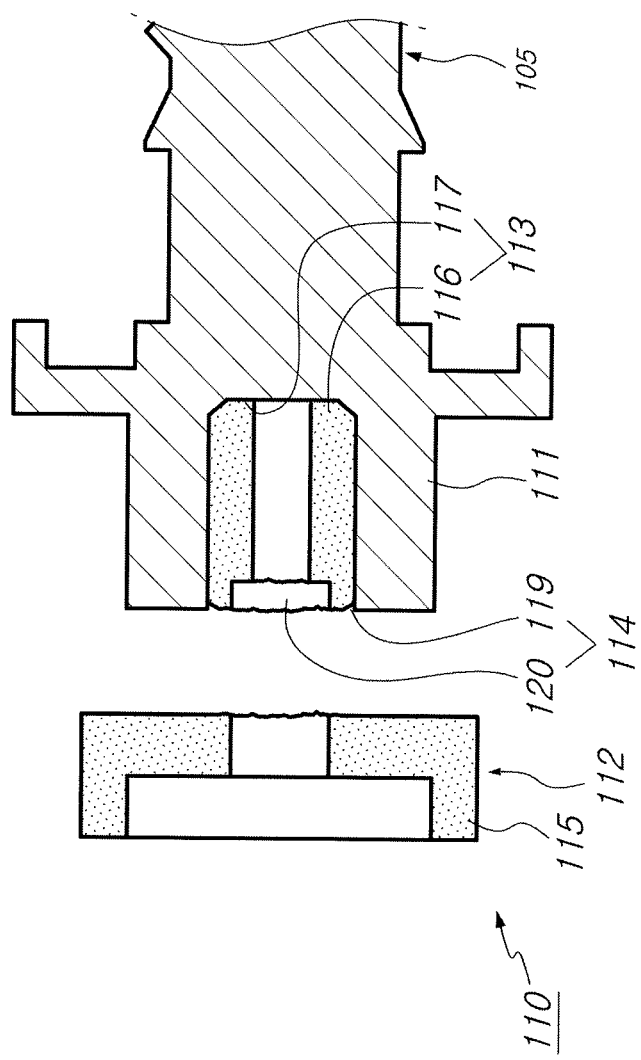
FIG. 6 schematically illustrates how a rupture is produced in the second exemplary embodiment of the inventive torque control bolt for a hose clamp.

FIG. 5 is a longitudinal cross-sectional view of a part of a second exemplary embodiment of the inventive torque control bolt for a hose clamp, and FIG. 6 schematically illustrates how a rupture is produced in the second exemplary embodiment of the inventive torque control bolt for a hose clamp.

Referring to FIGS. 5 and 6, there is formed a tightening hole 125 to extend from the rupture guide recess 120 formed in the bolt body 115 of the rupture bolt 112 through the bolt body 115. The tightening hole 125 may be configured such that, when the tightening hole 125 is compressed by a punch 126, the male coupler 116 is deformed to be rigidly coupled to the female coupler 117.

Of course, the diameter of the tightening hole 125 is preferably smaller than the diameter of the rupture guide recess 120 so that, when the tightening hole 125 is deformed by an assembling tool 126, such as the punch, the damage of the rupture guide recess 120 may be prevented to correctly transmit the set torque to the fastening bolt 105 and then the rupture guide recess 120 may be ruptured.

Figure 7:
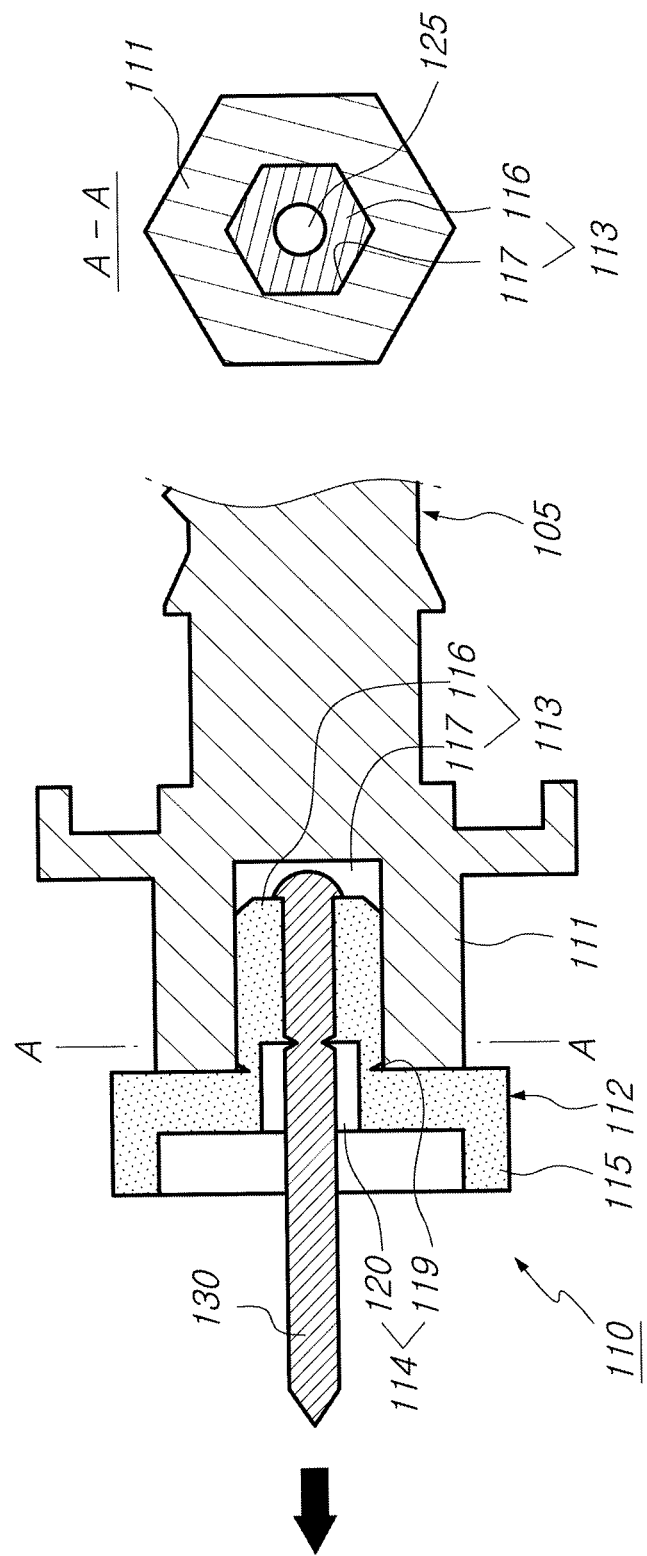
FIG. 7 is a longitudinal cross-sectional view of a part of a third exemplary embodiment of the inventive torque control bolt for a hose clamp.
Figure 8:
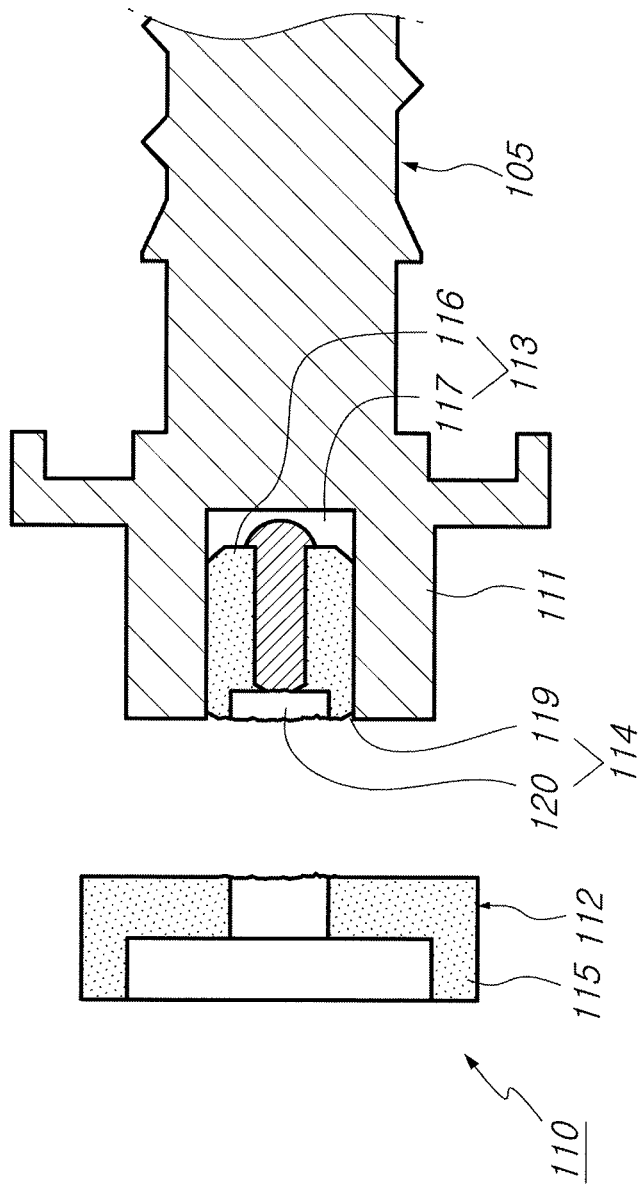
FIG. 8 schematically illustrates how a rupture is produced in the third exemplary embodiment of the inventive torque control bolt for a hose clamp.

FIG. 7 is a longitudinal cross-sectional view of a part of a third exemplary embodiment of the inventive torque control bolt for a hose clamp, and FIG. 8 schematically illustrates how a rupture is produced in the third exemplary embodiment of the inventive torque control bolt for a hose clamp.

Referring to FIGS. 7 and 8, a rivet 130 may be coupled to the tightening hole 125 formed to extend from the rupture guide recess 120 of the rupture bolt 112. The rivet 130 may be pulled by using an assembling tool, such as a conventional riveter, to deform the male coupler 116, so that the rigid coupled condition between the male coupler 116 and the female coupler 117 can be maintained.

Figure 9:
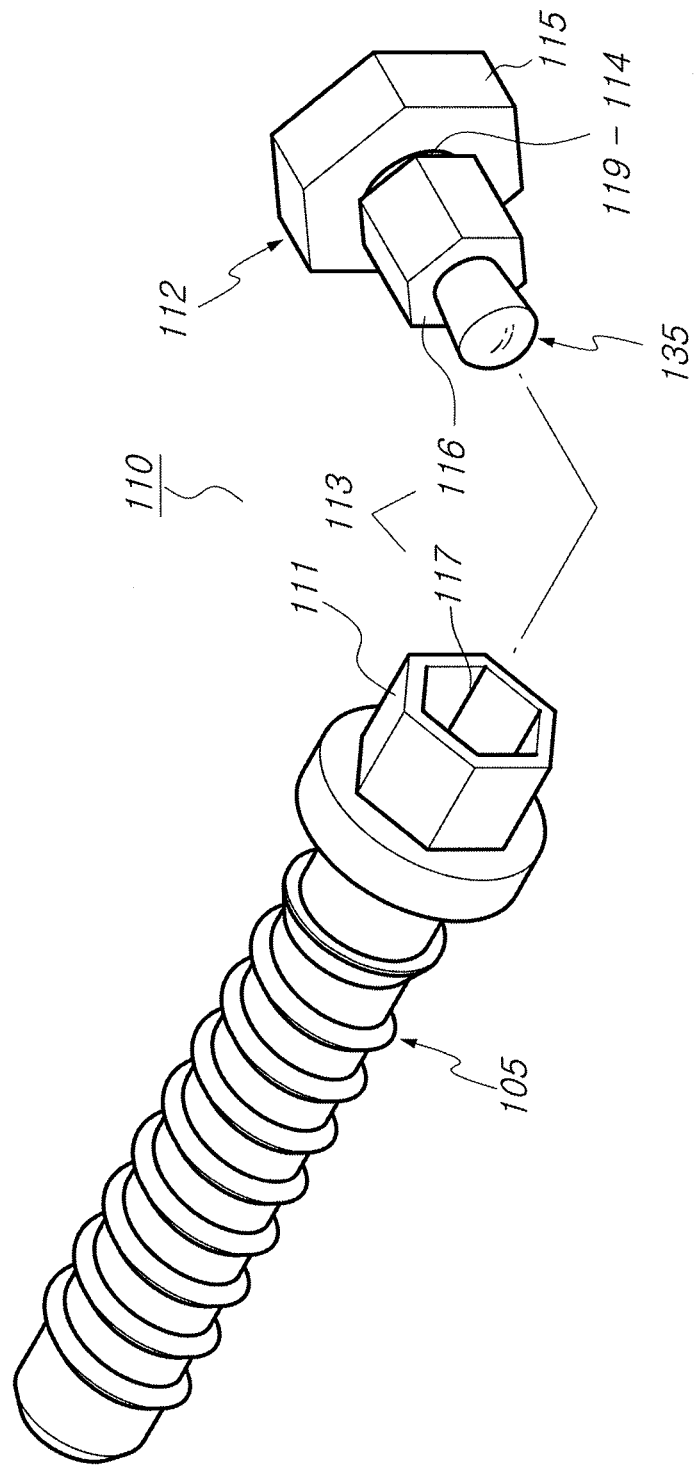
FIG. 9 is an exploded perspective view illustrating a fourth exemplary embodiment of the inventive torque control bolt for a hose clamp.
Figure 10:
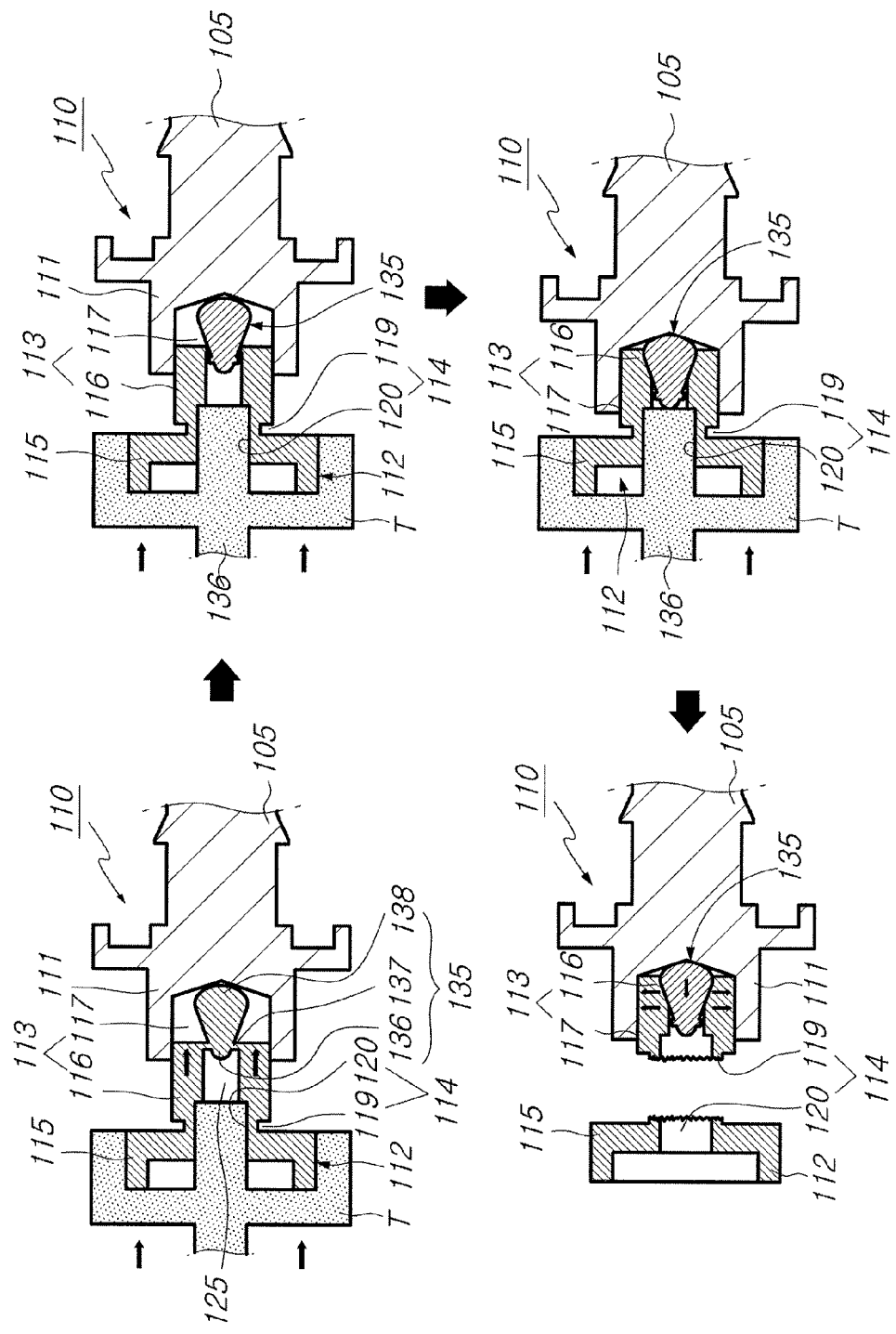
FIG. 10 schematically illustrates how a rupture is produced in the fourth exemplary embodiment of the inventive torque control bolt for a hose clamp.
Figure 11:
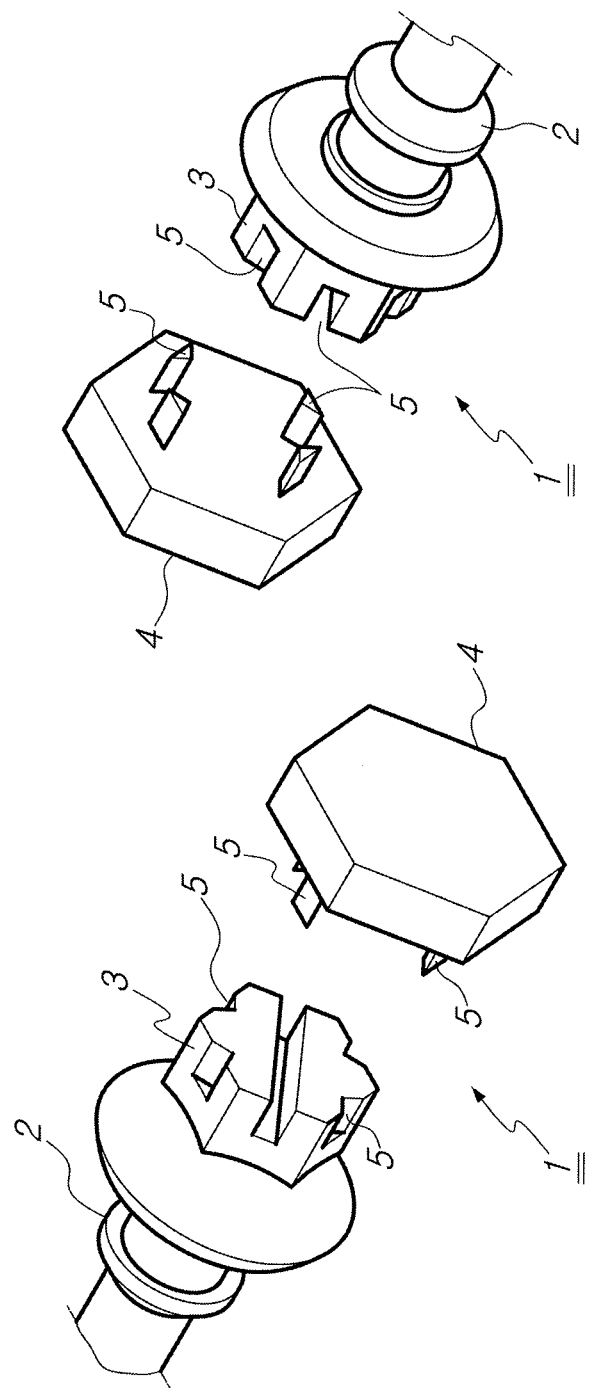
FIG. 11 illustrates a torque control cap, to which a prior art is applied.

FIG. 9 is an exploded perspective view illustrating a fourth exemplary embodiment of the inventive torque control bolt for a hose clamp, and FIG. 10 schematically illustrates how a rupture is produced in the fourth exemplary embodiment of the inventive torque control bolt for a hose clamp.

Referring to FIGS. 9 and 10, an expansion sinker 135 is formed on the inside of the male coupler 116 formed on the rupture bolt 112 in such a manner that the expansion sinker 135 extends integrally with the male coupler 135, in which the expansion sinker 135 is connected to the inner end of the male coupler 116 through a retaining rim 137 with a thin thickness (about 0.2 mm), so that, when the retaining rim 137 is broken by the assembling force of an assembling tool 'T', the expansion sinker 135 helps the male coupler 116 to keep the rigid coupling state with the female coupler 117.

The expansion sinker 135 is formed with a guide protrusion 136 protruding into the tightening hole 125 to guide the expansion sinker 135 to be introduced into the tightening hole 125 formed in the tightening hole 125, and is formed with a sinker body 138 at the side opposite to the guide protrusion 136 (adjacent to the female coupler 117). The sinker body 138 is formed in a conical shape, of which the diameter is larger than that of the tightening hole 125.

In this case, when the assembling tool grips and couples the rupture bolt 112 to the fastening bolt 105, the male coupler 116 of the rupture bolt 112 is accommodated in the female coupler 117 of the fastening bolt 105, and when the male coupler 116 is inserted more deeply, the expansion sinker 135, which is a part of the coupling unit 113 integrally formed on the male coupler 116, comes into contact with the female coupler 117.

Then, the thin retaining rim 137, which interconnects the male coupler 116 and the expansion sinker 135, is broken. As such, the guide protrusion 136, which is a part of the expansion sinker 135, is enabled to be guided into the tightening hole 125 formed in the male coupler 116, and the sinker body 137 with a diameter larger than that of the tightening hole 125 is also enabled to be introduced into the tightening hole 125, thereby deforming the male coupler 116 to keep the rigid coupling state between the male coupler 116 and the female coupler 117.

It is natural that the male coupler 116 and female coupler 117 illustrated in another exemplary embodiment of the coupling unit 113 applied to the second to fourth exemplary embodiments should have shapes which render the male coupler 116 and female coupler 117 not to be relatively rotatable in the state where they are coupled to each other, so that, when the hose clamp 100 is fastened using a tool, the male coupler 116 is capable of transmitting the force applied by the tool to the fastening bolt 105 through the female coupler 117.

Although various shapes for the male coupler 116 and the female coupler 117, such as a triangular shape, a rectangular shape, a pentagonal shape, an octagonal shape, and a semicircular shape, are exemplified through FIGS. 5, 7 and 9, the present invention is not limited to these shapes.

What is claimed is:

1. A torque control bolt for a hose clamp, which is configured to transmit a torque from a tool to a fastening bolt of a hose clamp to induce the normal fastening of the hose clamp, and then to be ruptured to prevent the transmission of torque exceeding a set value so as to prevent the damage of the hose clamp and the hose, the control bolt comprising:

a rupture bolt with a fastening body to transmit the torque from the tool to a head of the fastening bolt;

a coupling unit formed on the head and the rupture bolt and configured to keep the coupling force between the head and the rupture bolt, wherein the coupling unit comprises a male coupler that protrudes from the center of the inner end of the bolt body of the rupture bolt toward the fastening bolt, and a female coupler formed concavely at the center of the head of the fastening bolt to accommodate the male coupler; and a rupture section formed on the rupture bolt and configured to prevent the torque from the tool from being transmitted to the fastening bolt when the torque exceeds the set value, wherein the rupture section comprises a notch formed at a boundary position between the bolt body and the male coupler, and a rupture guide recess formed extending from the center of the outer end toward the inner end of the bolt body to reduce the thickness at a position to be ruptured.

2. The torque control bolt as claimed in claim 1, wherein the size of the bolt body is larger or smaller than that of the head of the fastening bolt so that, when a tool is used, the head of the fastening bolt is prevented from being coupled and rotated together with the bolt body.

3. The torque control bolt as claimed in claim 1, wherein the depth of the rupture guide recess is determined such that the rupture guide recess extends from the outer end of the bolt body to a position in the bolt body deeper than the position of the notch.

4. The torque control bolt as claimed in claim 1, wherein the coupling unit is configured to keep the coupled state of the male coupler and the female coupler, and further comprises threads which are formed on the outer periphery of the male coupler and the inner periphery of the female coupler, respectively.

5. The torque control bolt as claimed in claim 1, wherein the coupling unit is configured to keep the coupled state of the male coupler and the female coupler, and further comprises a tightening hole which is formed to extend through the bolt body from the rupture guide recess in the bolt body, the tightening hole being configured such that, when the tightening hole is compressed by an assembling tool, the male coupler is deformed to be engaged with the female coupler.

6. The torque control bolt as claimed in claim 5, wherein the diameter of the tightening hole is smaller than that of the rupture guide recess, so that when the male coupler is deformed, the damage and deformation of the rupture guide recess can be prevented.

7. The torque control bolt as claimed in claim 5, wherein the male coupler and the female coupler are formed in shapes which render the male coupler and female coupler not to be relatively rotatable in the state where they are coupled to each other.

8. The torque control bolt as claimed in claim 1, wherein the coupling unit is configured to keep the coupled state of the male coupler and the female coupler, and further comprises a tightening hole formed to extend from the rupture guide recess, and a rivet coupled to the tightening hole, the tightening hole and the rivet being configured such that, when the rivet is pulled by an assembling tool, the male coupler is deformed to be engaged with the female coupler.

9. The torque control bolt as claimed in claim 1, wherein the coupling unit is configured to keep the coupled state of the male coupler and the female coupler, and further comprises an expansion sinker which is formed in the inner side of the male coupler to extend integrally with the male coupler, and connected with the inner end of the male coupler by a retaining rim in such a manner that, when the retaining rim is broken by an assembling force applied from an assembling tool, the expansion sinker enables the male coupler to be rigidly engaged with the female coupler, wherein the expansion sinker comprises: a guide protrusion protruding into the tightening hole to guide the expansion sinker into the tightening hole of the male coupler; and a sinker body formed at the side opposite to the guide protrusion to have a diameter larger than that of the tightening hole.

\* \* \* \* \*